US009375685B2

(12) United States Patent
Kulkarni et al.

(10) Patent No.: US 9,375,685 B2
(45) Date of Patent: Jun. 28, 2016

(54) MEMBRANE FOR THE SEPARATION OF A MIXTURE OF A POLAR FLUID AND A NON-POLAR FLUID AND METHODS FOR USE THEREOF

(71) Applicant: L'Air Liquide, Societe Anonyme pour l'Etude et Exploitation des Procedes Georges Claude, Paris (FR)

(72) Inventors: Sudhir S. Kulkarni, Wilmington, DE (US); Madhava R. Kosuri, Newark, DE (US); Fan Worley, Newark, DE (US)

(73) Assignee: L'Air Liquide Société Anonyme Pour L'Étude Et L'Exploitation Des Procedes Georges Claude, Pari (FR)

(*) Notice: Subject to any disclaimer, the term of this patent is extended or adjusted under 35 U.S.C. 154(b) by 65 days.

(21) Appl. No.: 14/243,428

(22) Filed: Apr. 2, 2014

(65) Prior Publication Data
US 2015/0273406 A1 Oct. 1, 2015

Related U.S. Application Data

(60) Provisional application No. 61/971,821, filed on Mar. 28, 2014.

(51) Int. Cl.
*B01D 71/70* (2006.01)
*B01D 53/22* (2006.01)
*B01D 19/00* (2006.01)
*B01D 69/12* (2006.01)
*B01D 71/76* (2006.01)
B01D 71/52 (2006.01)

(52) U.S. Cl.
CPC ............. *B01D 71/70* (2013.01); *B01D 19/00* (2013.01); *B01D 53/228* (2013.01); *B01D 69/125* (2013.01); *B01D 71/76* (2013.01); B01D 71/52 (2013.01); B01D 2323/30 (2013.01); Y02C 10/10 (2013.01)

(58) Field of Classification Search
CPC ...... B01D 53/228; B01D 19/00; B01D 71/58; B01D 71/70; B01D 69/10
USPC ........................ 96/6, 11; 95/45, 46, 47, 49, 51
See application file for complete search history.

(56) References Cited

U.S. PATENT DOCUMENTS

| 4,342,723 | A | * | 8/1982 | Sado et al. ............................ 96/6 |
| 4,606,740 | A | | 8/1986 | Kulprathipanja |
| 4,608,060 | A | | 8/1986 | Kulprathipanja et al. |
| 4,644,046 | A | * | 2/1987 | Yamada ............................ 96/14 |
| 4,781,733 | A | * | 11/1988 | Babcock et al. .................. 95/51 |
| 4,963,165 | A | | 10/1990 | Blume et al. |
| 5,102,551 | A | * | 4/1992 | Pasternak ...................... 210/651 |
| 5,595,658 | A | * | 1/1997 | Fritsch et al. ................. 210/490 |
| 5,964,725 | A | * | 10/1999 | Sato et al. .................... 604/4.01 |
| 6,843,829 | B2 | | 1/2005 | Simmons |
| 6,860,920 | B2 | | 3/2005 | Simmons |
| 7,708,804 | B2 | | 5/2010 | Darde et al. |
| 2005/0000897 | A1 | * | 1/2005 | Radomyselski et al. ...... 210/644 |
| 2009/0246114 | A1 | * | 10/2009 | Sah et al. ....................... 423/352 |
| 2012/0279922 | A1 | * | 11/2012 | Haensel et al. .............. 210/650 |
| 2012/0296062 | A1 | * | 11/2012 | Hoelzl et al. .................... 528/28 |
| 2014/0137736 | A1 | * | 5/2014 | Ahn et al. .......................... 95/51 |
| 2014/0322519 | A1 | * | 10/2014 | Ahn et al. .......................... 95/51 |
| 2015/0135957 | A1 | * | 5/2015 | Sharma ............................ 96/10 |

FOREIGN PATENT DOCUMENTS

| EP | 0 188 895 | 7/1986 |
| WO | WO 2014 059 132 | 4/2014 |

OTHER PUBLICATIONS

Lin, H. and Freeman, B.D.;Gas solubility, diffusivity and permeability in poly(ethylene oxide); Journal of Membrane Science; Aug. 1, 2004, pp. 105-117; vol. 239, 1; Elsevier B.V.

Park, H. B., et al.; Gas separation properties of polysiloxane/polyether mixed soft segment urethane urea membranes; Journal of Membrane Science; Jul. 15, 2002; pp. 257-269; vol. 204, 1-2; Elsevier B.V.

Reijerkerk, S. R., et al.; Poly(ethylene glycol) and poly(dimethyl siloxane): Combining their advantages into efficient CO2 gas separation membranes; Journal of Membrane Science; Apr. 15, 2010, pp. 126-135; vol. 352, 1-2; Elsevier B.V.

International Search Report and Written Opinion for PCT/US2015/022988, mailed Jul. 7, 2015.

Madhavan, et al., "Poly(dimethylsiloxane-urethane) membranes: Effect of hard segment in urethane on gas transport properties," Journal of Membrane Science, vol. 283, No. 1-2, Oct. 20, 2006, pp. 357-365.

* cited by examiner

*Primary Examiner* — Jason M Greene
(74) *Attorney, Agent, or Firm* — Christopher J. Cronin

(57) ABSTRACT

A composite fluid separation membrane includes a separation layer on a porous support layer where the separation layer comprises a cross-linked polysiloxane copolyether.

20 Claims, No Drawings

MEMBRANE FOR THE SEPARATION OF A MIXTURE OF A POLAR FLUID AND A NON-POLAR FLUID AND METHODS FOR USE THEREOF

CROSS-REFERENCE TO RELATED APPLICATIONS

This application claims the benefit of U.S. Provisional Application No. 61/971,821 filed Mar. 28, 2014, the disclosure of which is incorporated herein by reference.

BACKGROUND

1. Field of the Invention

The present invention relates to a process and apparatus for the separation of a polar fluid from a non-polar fluid using a fluid separation membrane.

2. Related Art

There is a variety of fluids that include polar and non-polar components in which it is desirable to separate the polar component from the non-polar component with the use of membranes, whether the membrane is a gas separation membranes or a pervaporative membrane.

One type of fluid including both polar and non-polar components is flue gas. Depending upon the type of oxidant used to combust the fuel and produce the flue gas, the flue gas can contain anywhere from 4-80% $CO_2$ along with minor yet sometimes significant amounts of $SO_2$ and NO pollutants. By $NO_R$, we mean one or more of oxides of nitrogen, including NO, $N_2O$, $N_2O_4$, and $NO_2$ and $N_2O_3$. While much of the $SO_2$ and NO in the flue gas is removed from the flue gas by a variety of conventional pollutant treatment methods, some $CO_2$ applications require even lower amounts of these pollutants. In recognition of this, some have proposed the use of a De-$NO_x$ column which separates the feed fluid into a $CO_2$ enriched gas for further purification in a stripping column and a $NO_x$-enriched liquid. However, the use of a De-$NO_x$ column still presents the challenge of dealing with the $NO_2$-enriched liquid bottom from the column. For example, U.S. Pat. No. 7,708,804 proposes three solutions: 1) vaporizing and recycling the $NO_2$-enriched liquid to the inlet of the compressor, 2) feeding the $NO_2$-enriched liquid to a wash column, and 3) combustion of the $NO_2$-enriched liquid in the flame of a burner.

While the approaches disclosed in U.S. Pat. No. 7,708,804 do present reasonable solutions for removal of the NO from the $CO_2$, each approach exhibits a disadvantage. Because the recycle stream in the first technique may represent about 5-10% of the total flow compressed and treated downstream of the compressor, the compressor and downstream equipment must be sized 5-10% larger than it would have to be if the $NO_2$-enriched stream was otherwise not recycled. There would also be a 5% to 10% increase in the required compression energy. Furthermore, the relatively higher acid gas content of the flue gas being compressed will produce a greater amount of acid gas condensate in the compressors, subjecting the compressors and driers to a more severe acidic attack in comparison to the absence of a $NO_2$ recycle stream. This more acidic attack may lead to a decreased useful lifetime for the compressors or require the compressor to be constructed of a more costly material that is sufficiently resistant to such acid fluids. Similar negative impacts upon the driers would be expected to occur due to the presence of the acid gas. The use of wash column would result in significant $CO_2$ losses unless the post-wash column fluid was recycled to the compressor. Reduction of $NO_2$ in the flame of a burner still results in significant $CO_2$ losses.

Thus, it is an object to propose an improved process and apparatus for separating $NO_2$ from a liquid containing $CO_2$ and $NO_2$ that does not exhibit the above-mentioned disadvantages.

Another type of fluid including both polar and non-polar components is natural gas. In order to avoid corrosion of natural gas pipelines, the $CO_2$ and $H_2S$ in the raw natural gas need to be removed. The current state of the art technique for the removal is the use of amine based adsorption systems to separate these gases. However this technology is highly energy intensive and is not environmentally friendly.

Thus, it is another object to propose an improved process and apparatus for separating $H_2S$ and/or $CO_2$ from natural gas that does not exhibit the above-mentioned disadvantages.

Membrane separations on the other hand are less energy intensive and environmentally friendly. While commercially available membranes such as cellulose acetate- and polyimide-based membranes can be used for this separation, there is a desire for commercial use membranes that have relatively greater fluxes.

Two terms, "permeability" and "selectivity", are used to describe the most important properties of membranes: productivity and separation efficiency respectively. Permeability (P) equals the pressure and thickness normalized flux, as shown in the following equation:

$$P_i = \frac{n_i \cdot I}{\Delta p_i} \tag{1}$$

where $n_i$ is the penetrant flux through the membrane of thickness (I) under a partial pressure ($\Delta p_i$). The most frequently used unit for permeability, Barrer, is defined as below:

$$\text{Barrer} = 10^{-10} \frac{cc(STP) \cdot cm}{cm^2 \cdot s \cdot cmHg} \tag{2}$$

Selectivity is a measure of the ability of one gas to flow through the membrane over that of another gas. When the downstream pressure is negligible, the ideal selectivity (based upon the permeabilities of pure gases) of the membrane, can be used to approximate the real selectivity (based upon the permeabilities of the gases in a gas mixture). In this case, the selectivity ($\alpha_{A/B}$) is the permeability of a first gas A divided by the permeability of a second gas B.

Polyimide based hollow fiber membranes are currently used for the separation of $H_2S$ and $CO_2$ from natural gas. These membranes are made by spinning porous polyimide membranes and post-treating them with sylgard, a poly (dimethyl-siloxane) polymer. The resulting membrane has properties of both the base polyimide polymer as well as sylgard. Since sylgard is a non-polar material, it has less affinity towards $CO_2$ and exhibits an inferior $CO_2/CH_4$ separation. This non-polar characteristic of sylgard compromises the net separation characteristics of composite membrane.

Thus, it is an object to provide a membrane for the separation of $H_2S$ and $CO_2$ from natural gas that exhibits a sufficiently desirable selectivity for these gases over methane.

The advantages of combining the high permeability of siloxane polymers such as polydimethyl silicone (PDMS) and the high affinity for polar species of polyethers such as polyethylene glycol (PEG) have been long recognized. For example, U.S. Pat. No. 4,606,740 and U.S. Pat. No. 4,608,060 prepared membranes by blending PDMS+PEG and showed increased selectivity and high permeance for polar gases such as $CO_2$, $SO_2$ and $NH_3$. However these blended materials are mechanically weak.

Thus, it is an object to provide a membrane material for the separation of polar fluids from non-polar fluids that is sufficiently mechanically strong.

Park, et al. studied polyurethanes and polyurethane ureas forming hard/soft segmented copolymers by reacting a diisocyanate (MDI) with various polyalkyl oxides and PDMS (Park, et al., J Membrane Science, vol. 204, pp 257-269, 2002). In these polymers, the individual PDMS and polyether moieties are separated by MDI linkages. The material $CO_2$/$N_2$ permeability-selectivity does not appear to be commercially viable.

Thus, it is an object to provide a process and apparatus for the membrane separation of polar fluids from non-polar fluids that is commercially viable.

Reijerkerk, et al. studied blends of a copolymer of 20% PDMS-80% PEG with PEBAX block copolymers (Reijerker, et al., J Membrane Science, vol. 352, pp 126-135, 2010). High polar gas permeability-selectivity can be obtained at high ratios (>50%) of the PDMS-PEG copolymer additive. However, these blend materials are expected to have the same weakness as the U.S. Pat. No. 4,606,740 approach.

Thus, it is an object to provide a process and apparatus for the membrane separation of polar fluids from non-polar fluids that is not mechanically weak.

Polyethers are known to have high affinity for polar gases (Lin & Freeman, J Membrane Science, vol. 239, pp 105-117, 2004). Also, several patents describe membrane materials based on a hard-soft segmented copolymer where the hard (rigid) segment could be a polyamide, polyester or polyurethane while the soft (flexible) segment is the polyether. Examples of such approaches include U.S. Pat. No. 4,963, 165, U.S. Pat. No. 6,843,829 and U.S. Pat. No. 6,860,920. PEBAX is an example of a commercially available hard-soft segmented copolymer where the hard segment is a polyamide.

Therefore and in view of the disadvantages of conventional processes and apparatuses, it is an object of the invention to provide a membrane-based process and apparatus that does not exhibit those disadvantages.

SUMMARY OF THE INVENTION

There is disclosed a composite fluid separation membrane comprising a separation layer supported by a porous support layer. The porous support layer comprises a polymeric material. The separation layer comprises a cross-linked polysiloxane copolyether. The polysiloxane copolyether comprises a polymeric chain comprising repeating units of the molecular segment of formula (1), a terminal molecular segment —O—W bonded to a silicon atom of one end of the chain where O is an oxygen atom, and a terminal molecular segment —W bonded to an oxygen atom of the other end of the chain:

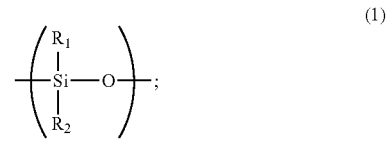

Each W is selected from the group consisting of a —Si($CH_3$)$_3$ group, the molecular segment of formula (2), the molecular segment of formula (3), and the molecular segment of formula (4);

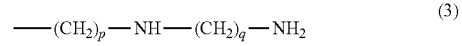

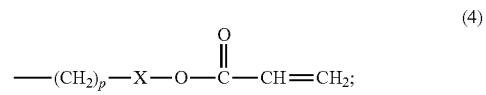

Each X comprises b repeating units of the molecular segment of formula (5) and c repeating units of the molecular segment of formula (6):

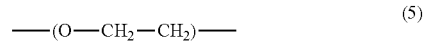

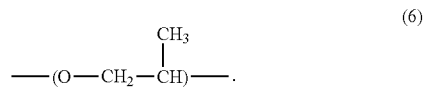

Each $R_1$ is a $C_1$-$C_6$ alkyl group. Each $R_2$ is individually selected from the group consisting of a phenyl group, a $C_1$-$C_6$ alkyl group, the molecular segment of formula (2), the molecular segment of formula (3), and the molecular segment of formula (4). If each W is a —Si($CH_3$)$_3$ group or the molecular segment of formula (3), then at least some $R_2$'s are the molecular segment of formula (2) or the molecular segment of formula (4). If each $R_2$ is either a phenyl group or a $C_1$-$C_6$ alkyl group, then each W is either the molecular segment of formula (2) or the molecular segment of formula (4). The integer p ranges from 1-3. The integer q ranges from 1-3. The integer b ranges from 0-400. The integer c ranges from 0-200. The number of repeating units where $R_2$ is a $C_1$-$C_6$ alkyl group is 1-2000.

DETAILED DESCRIPTION OF THE INVENTION

The invention is directed towards new membranes exhibiting superior polar fluid/non-polar fluid (especially $CO_2$/$CH_4$, $H_2S$/$CH_4$, $H_2O$/$CH_4$, and $H_2S$/$CO_2$) selectivities compared to existing membranes. More particularly, the invention is directed to a composite membrane comprising a separation layer supported by a porous fiber support, where the separation layer is relatively more polar. This is done by chemically cross-linking certain types of polysiloxane copolyethers to form a thin film coating. The thin film coating exhibits a sufficiently high affinity for polar fluids and also material robustness in use.

In contrast to the materials disclosed in U.S. Pat. Nos. 4,963,165, 6,843,829 and 6,860,920, the materials proposed herein are composed primarily of all soft segments (PDMS-based segments and polyether-based segments) which have relatively different hydrophilicity. Polyethers are highly hydrophilic while PDMS is hydrophobic. The material robustness of the inventive membrane is obtained by crosslinking functional groups present on the polymeric chain.

The polysiloxane copolyether comprises a polymeric chain comprising repeating units of the molecular segment of formula (1), a terminal molecular segment —O—W bonded to a silicon atom of one end of the chain where O is an oxygen atom, and a terminal molecular segment —W bonded to an oxygen atom of the other end of the chain:

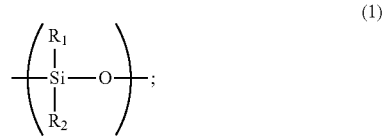
(1)

Each W is selected from the group consisting of a —Si(CH$_3$)$_3$ group, the molecular segment of formula (2), the molecular segment of formula (3), and the molecular segment of formula (4);

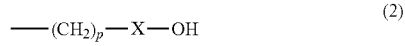
(2)

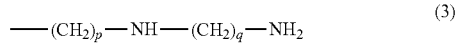
(3)

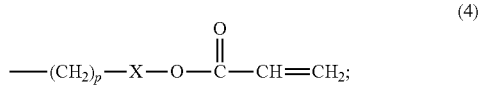
(4)

Each X comprises b repeating units of the molecular segment of formula (5) and c repeating units of the molecular segment of formula (6):

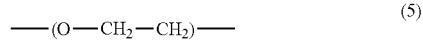
(5)

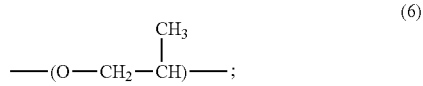
(6)

Each $R_1$ is a $C_1$-$C_6$ alkyl group. Each $R_2$ is individually selected from the group consisting of a phenyl group, a $C_1$-$C_6$ alkyl group, the molecular segment of formula (2), the molecular segment of formula (3), and the molecular segment of formula (4);

In order to ensure the presence of a polyether content in the polysiloxane copolyether, the following two conditions apply. First, if each W is a —Si(CH$_3$)$_3$ group or the molecular segment of formula (3), then at least some R's are the molecular segment of formula (2) or the molecular segment of formula (4). Second, if each $R_2$ is either a phenyl group or a $C_1$-$C_6$ alkyl group, then each W is either the molecular segment of formula (2) or the molecular segment of formula (4).

The following integers have the following ranges:
p: 1-3;
q: 1-3;
b: 0-400;
c: 0-200.

The number of repeating units where $R_2$ is a $C_1$-$C_6$ alkyl group is 1-2000.

The ratio of polyether segments to polysiloxane segments may vary. When W is —Si(CH$_3$)$_3$ group, cross-linking sites are present in the middle of the chain and the ratio of the number of molecular segments that are of either formulae (5) or (6) to the number of silicon atoms in the chain ranges from about 0.05 to about 6.0. When each $R_2$ is either a phenyl group or a $C_1$-$C_6$ alkyl group, cross-linking sites are present at each end of the chain and the ratio of the number of molecular segments that are of either formulae (5) or (6) to the number of silicon atoms in the chain ranges from about 0.05 to about 0.33. In this case, robustness can be achieved by using greater content of siloxane-based repeating units or by using crosslinking agents with functionality greater than 2.

A potential cross-linking site may be wherever either W or $R_2$ is the molecular segment of formulae (2), (3), or (4). The type of linkage formed at the cross-linked site will depend upon the W or $R_2$ in question and the type of cross-linking agent or cross-linking promoter. For W's and $R_2$'s of the molecular segment of formula (2), a urethane linkage may be formed using a monomeric diisocyanate, a monomeric triisocyanate or polymeric isocyanate cross-linking agent. For W's and $R_2$'s of the molecular segment of formula (3), a urea linkage may be formed using a monomeric diisocyanate, a monomeric triisocyanate or polymeric isocyanate cross-linking agent. For W's and $R_2$'s of the molecular segment of formula (3), an amide linkage may instead be formed using a di-acyl chloride substituted aromatic cross-linking agent, or a tri-acyl chloride substituted aromatic cross-linking agent. For W's and $R_2$'s of the molecular segment of formula (4), the copolymer may be cross-linked using a free radical cross-linking promoter, such as an azo or peroxide free radical initiator.

Non-limiting examples of suitable monomeric diisocyanate, monomeric triisocyanate or polymeric isocyanate cross-linking agents are toluene diisocyanate (TDI) commercially available from a wide variety of sources or cyanate-functionalized siloxanes commercially available from Siltech. Non-limiting examples of suitable di-acyl chloride substituted aromatic cross-linking agents and tri-acyl chloride substituted aromatic cross-linking agents include 1,3-benzenedicarbonyl dichloride, 1,4-benzenedicarbonlyldichloride, and 1,3,5-benzenetricarbonyl trichloride.

The cross-linked polysiloxane copolyether may optionally be cross-linked together with one or more silicone elastomers. The silicone elastomer may be derived from a first silicone polymer having a first reactive functional group (such as a vinylsiloxane unit) and a crosslinking agent having a second reactive functional group (such as a silicon hydride unit). Suitable silicone elastomer components may be commercially obtained from Momentive under trade name RTV615 and from Dow Corning under trade name Sylgard 184, 182, or 186.

Particularly suitable types of polysiloxane copolyethers may be commercially obtained from Siltech under the trade names D-208, Di-2510, Di-5018F, Di1010, and J-1015-O.

While the composite membrane module may have any configuration known in the field of gas separation, typically it is formed around a core as a spirally wound sheet(s) or as a plurality of hollow fibers. The methods of manufacture are well known to those skilled in the art of membrane separations. The porous support layer provides mechanical strength to the membrane without sacrificing flux. Thus, the porous support layer may be made of any suitable material known in the field of membrane separation to have a flux sufficiently high (for the feed fluid at hand) so as to not inhibit permeation of the polar component through the membrane. In the case of hollow fibers, the porous support layer may have a thickness ranging from about 25 μm to about 300 μm, while the separation layer comprising the cross-linked polysiloxane copolyether may have a thickness ranging from about 0.1 µm to about 50 µm.

In the case of a spirally wound sheet(s), each sheet may be formed according to techniques well know to the skilled artisan. Typically, the separation layer is coated upon the support layer after the support layer is formed.

In the case of hollow fibers, the fibers may be spun from a spinneret as a composite fluid where the separation layer dope solution is extruded from an outer annulus, the support layer dope solution is extruded from an inner annulus adjacent to the outer annulus, and a bore fluid is injected from a bore on the inside of the inner annulus. The composite fiber may be coagulated and further processed according to well known techniques. Preferably, the fibers may be spun from a spinneret having only one annulus—through which the support dope solution is extruded—and a bore on the inside of the annulus. The thus-spun fiber may then be coagulated and further processed according to well known techniques and a suspension or solution (of the polysiloxane copolyether and cross-linking agent or promoter) coated upon the coagulated fiber, again according to techniques well known to those skilled in the art of hollow fiber spinning. Instead of coating each of the polysiloxane copolyether and cross-linking agent or promoter in a single solution or suspension, they may be separately coated upon the spun fiber in sequential fashion. In this latter case, they may be suspended or dissolved in different solvents. Again in this latter case, an optional drying step can be employed after the first coating in order to remove the first solvent completely from the system before performing the second coating. This may be done in a situation when the first solvent interacts unfavorably with the polysiloxane copolyether or cross-linking agent/promoter of the second coating. Finally, compatibilizing agents including non-polar segments and polar segments can be used to solubilize or emulsify the polysiloxane copolyether in useful solvents.

In operation, the feed fluid (comprising a relatively polar fluid and a relatively non-polar fluid) is introduced to a feed inlet of the membrane at any desired pressure and temperature. The fluid may be a liquid in which case the membrane is operated pervaporatively or it may be gaseous in which case it is operated as a gas separation membrane. The intrinsic property of the polysiloxane copolyether causes the relatively polar component of the mixture to selectively permeate through the membrane in comparison to the relatively non-polar component. Simultaneously, a permeate gas (enriched in the relatively polar component and deficient in the relatively non-polar component) is withdrawn from the permeate outlet of the membrane while a non-permeate fluid (deficient in the relatively polar component and enriched in the relatively non-polar component) is withdrawn from a non-permeate (sometimes referred to as retentate) outlet of the membrane. A sweep gas may optionally be fed to the permeate outlet for purposes of enhancing permeation of the relatively polar component through the membrane by lowering the partial pressure of the relatively polar component on a side of the membrane opposite that which the feed fluid is introduced.

A wide variety of feed fluids (containing the relatively polar or non-polar components) may be separated with the inventive membrane. Non-limiting examples of feed fluids include natural gas (whether in gaseous or liquefied form) and a $NO_2$-enriched liquid from the bottom of a De-NOx distillation column. Natural gas predominantly contains $CH_4$ but may also include lesser amounts of $N_2$, $CO_2$, $NO_2$, $SO_2$, and $H_2S$. In this case, the $CO_2$, $NO_2$, $SO_2$, and $H_2S$ are more polar than $CH_4$. However, the $NO_2$, $SO_2$, and $H_2S$ are more polar than the $CO_2$. Thus, one of ordinary skill in the art will recognize that $CO_2$, $NO_2$, $SO_2$, and $H_2S$ may be separated from the $CH_4$ and $NO_2$, $SO_2$, and $H_2S$ may be separated from $CO_2$. The $NO_2$-enriched liquid from the bottom of a De-NOx column contains both $NO_2$ and $CO_2$. Because $NO_2$ is more polar than $CO_2$, the membrane may be used to separate $NO_2$ from the $NO_2$-enriched liquid.

EXAMPLES

Five different hydroxyl group-substituted polysiloxane copolyethers were obtained from Siltech under trade names D-208, Di-2510, Di-1018F, Di1010, and J-1015-O. Each may characterized as either a linear (Di-2510, Di-5018F, Di1010) in which case the cross-linkable sites are located on the ends of the chain or as a multifunctional (D-208, J-1015-O) in which case the cross-linkable sites are located on pendant groups.

These are the structures of the linear and multifunctional copolymers:

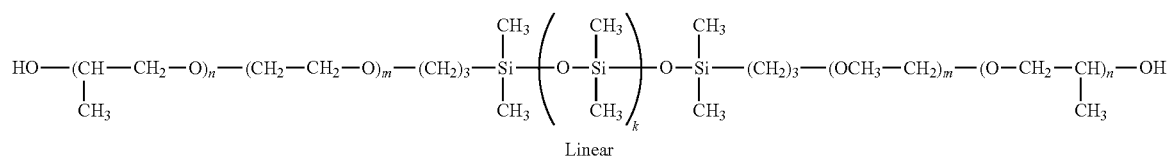

Linear

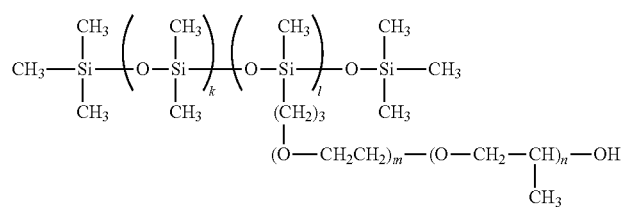

Multi

Their solubility and viscosity properties are listed below in Table I. Their structures are characterized in Table II. Each of the copolymers was reacted at a 10:1 (wt/wt) ratio with tolune diisocyanate cross-linking agent and the resultant film (or lack thereof) evaluated. The results of the evaluation are listed in Table III.

TABLE I solubility and viscosity of various Silsurf copolymers

|  | D-208 | Di-2510 | Di-5018F | Di1010 | J-1015-O |
|---|---|---|---|---|---|
| Hexane solubility | insoluble | insoluble | insoluble | insoluble | insoluble |
| Cyclohexane solubility | cloudy | clear | slightly cloudy | slightly cloudy | clear |
| Viscosity | low | low | high | low | low |

TABLE II structural characterization of various Silsurf copolymers

|  | D-208 | Di-2510 | Di-5018F | Di1010 | J-1015-O |
|---|---|---|---|---|---|
| Stoichiometry | k = 4<br>l = 4<br>m = 8<br>n = 0 | k = 25<br>m = 10<br>n = 0 | k = 50<br>m = 18<br>n = 6 | k = 10<br>m = 10<br>n = 0 | k = 90<br>l = 10<br>m = 15<br>n = 15 |
| Ratio of $CH_2CH_2O$—:siloxane group | 4 | 0.8 | 0.72 | 2.0 | 1.5 |
| Ratio of $CH_2CHCH_3O$—:siloxane group | — | — | 0.24 | — | 1.5 |

TABLE III evaluation of film from 10:1 (wt/wt) reaction of Silsurf/TDI

| D-208 | Di-2510 | Di-5018F | Di1010 | J-1015-O |
|---|---|---|---|---|
| Strong, non-uniform film | no film/viscous state | no film/gel state | no film/viscous state | Strong, uniform film |

Example 1

A disc-shaped film was formed by pouring a casting solution of 10:1 wt/wt ratio Silsurf J1015 and TDI into a 3.5 inch diameter ring. After allowing the hexane and cyclohexane to evaporate from the film while in a hood, the film was kept in a vacuum oven at 70° C. overnight for the film to form. It exhibited a 0.0447 cm thickness.

Example 2

A disc-shaped film was similarly formed by pouring a casting solution of 10:1:0.5 wt/wt ratio Silsurf J1015, TDI, and Sylgard 184 (Sylgard 184 consists of part A (base) and part B (curing agent) at 10:1 ratio) into a 3.5 inch diameter ring. The film was kept in an 80° C. vacuum oven with an $N_2$ purge overnight followed by maintaining the temperature in the oven at 100° C. for a half day for the film to form. It exhibited a 0.0603 cm thickness.

The permeance of $N_2$, He, and $CO_2$ through each film was measured. Table IV lists the permeances and variously calculated selectivities.

| Ex. | $N_2$ (Barrers) | He (Barrers) | $CO_2$ (Barrers) | $\alpha$, He/$N_2$ | $\alpha$, $CO_2$/$N_2$ | $\alpha$, $CO_2$/He |
|---|---|---|---|---|---|---|
| 1 | 32.9 | 80 | 522 | 2.43 | 15.89 | 6.53 |
| 2 | 92.3 | 174.9 | 2084.6 | 1.90 | 22.63 | 11.92 |

Based upon the film results in Table III, we concluded that each of the linear copolymers had too great of a polyether content and too low of a polysiloxane content. We believe that, for linear copolymers for use in the invention, a ratio of the number of ether repeating units to the number of silicon atoms should be no greater than 0.33. On the other hand, a film was formed for each of the multifunctional copolymers. Because multifunctional copolymers should in theory cross-link to form more robust structures, we believe that the ratio of the number of ether repeating units to the number of silicon atoms can range as high 6.0. We further argue that the strength of the film may be enhanced by lowering this ratio. This may be done selection of the appropriate stoichiometry for the copolymer or, in the case of a copolymer having a relatively higher ratio, by cross-linking the copolymer with one or more silicone elastomers.

Without being bound by any particular theory, based upon the film results in Table IV, it appears that the additional cross-linking provided by the silicone elastomer has a surprisingly beneficial effect upon membrane performance in comparison to the cross-linked polysiloxane copolyether alone.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural references, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A composite fluid separation membrane comprising a separation layer supported by a porous support layer, the porous support layer comprising a polymeric material, the separation layer comprising a cross-linked polysiloxane copolyether, wherein:

the polysiloxane copolyether comprises a polymeric chain comprising repeating units of the molecular segment of formula (1), a terminal molecular segment —O—W bonded to a silicon atom of one end of the chain where O is an oxygen atom, and a terminal molecular segment —W bonded to an oxygen atom of the other end of the chain:

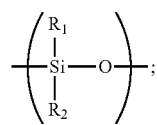   (1)

each W is a —Si(CH$_3$)$_3$ group;

each X comprises b repeating units of the molecular segment of formula (5) and c repeating units of the molecular segment of formula (6):

   (5)

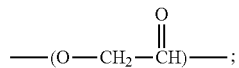   (6)

each R$_1$ a C1-C6 alkyl group;

each R$_2$ is individually selected from the group consisting of a phenyl group, a C$_1$-C$_6$ alkyl group, the molecular segment of formula (2), the molecular segment of formula (3), and the molecular segment of formula (4):

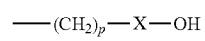   (2)

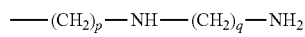   (3)

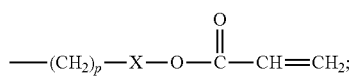   (4)

at least some R$_2$'s are the molecular segment of formula (2) or the molecular segment of formula (4);

p is an integer ranging from 1-3;

q is an integer ranging from 1-3;

b is an integer ranging from 0-400;

c is an integer ranging from 0-200;

the number of repeating units where R$_2$ is a C$_1$-C$_6$ alkyl group is 1-2000; and $$0.05 \leq \frac{\text{number of molecular segments that are of either formulae (5) or (6)}}{\text{number of Si atoms in chain}} \leq 6.$$

2. The membrane of claim 1, wherein:
each R$_2$ is individually selected from the group consisting of a phenyl group, a C$_1$-C$_6$ alkyl group, and the molecular segment of formula (2); and
the polysiloxane copolyether is cross-linked with a monomeric diisocyanate, a monomeric triisocyanate or a polymeric isocyanate cross-linking agent.

3. The membrane of claim 1, wherein:
at least some of the R$_2$'s are the molecular segment of formula (4);
at least some of the R$_2$'s are the molecular segment of formula (3); and
the polysiloxane copolyether is cross-linked with a monomeric diisocyanate cross-linking agent, a monomeric triisocyanate cross-linking agent, a polymeric isocyanate cross-linking agent, a di-acyl chloride substituted aromatic cross-linking agent, or a tri-acyl chloride substituted aromatic cross-linking agent.

4. The membrane of claim 1, wherein:
each R$_2$ is individually selected from the group consisting of a phenyl group, a C$_1$-C$_6$ alkyl group, the molecular segment of formula (2) and the molecular segment of formula (4);
at least some of the R$_2$'s are the molecular segment of formula (4); and
the polysiloxane copolyether is cross-linked using a free radical cross-linking promoter.

5. A composite fluid separation membrane comprising a separation layer supported by a porous support layer, the porous support layer comprising a polymeric material, the separation layer comprising a cross-linked polysiloxane copolyether, wherein:
the polysiloxane copolyether comprises a polymeric chain comprising repeating units of the molecular segment of formula (1), a terminal molecular segment —O—W bonded to a silicon atom of one end of the chain where O is an oxygen atom, and a terminal molecular segment —W bonded to an oxygen atom of the other end of the chain:

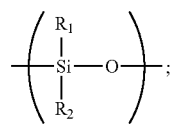   (1)

each W is selected from the group consisting of the molecular segment of formula (2) and the molecular segment of formula (4);

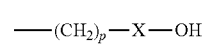   (2)

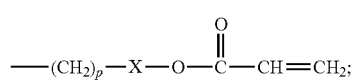   (4)

each X comprises b repeating units of the molecular segment of formula (5) and c repeating units of the molecular segment of formula (6):

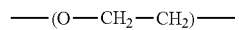
(5)

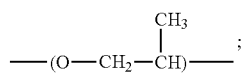
(6)

each $R_1$ a C1-C6 alkyl group;
each $R_2$ is individually selected from the group consisting of a phenyl group and a $C_1$-$C_6$ alkyl group;
p is an integer ranging from 1-3;
q is an integer ranging from 1-3;
b is an integer ranging from 0-400;
c is an integer ranging from 0-200;
the number of repeating units where $R_2$ is a $C_1$-$C_6$ alkyl group is 1-2000; and $$0.05 \leq \frac{\text{number of molecular segments that are of either formulae (5) or (6)}}{\text{number of Si atoms in chain}} \leq 0.33.$$

6. The membrane of claim 5, wherein:
each W is the molecular segment of formula (2); and
the polysiloxane copolyether is cross-linked with a polymeric or tri-functional isocyanate cross-linking agent.

7. The membrane of claim 5, wherein:
each W is the molecular segment of formula (4);
the polysiloxane copolyether is cross-linked using an azo or peroxide free radical initiator.

8. The membrane of claim 1, wherein the cross-linked polysiloxane copolyether is also cross-linked together with one or more silicone elastomers.

9. A method of separating a relatively polar fluid from relatively non-polar fluid, comprising the steps of:
introducing a feed fluid comprising the relative polar fluid and the relatively non-polar fluid to the membrane of claim 1;
withdrawing from the membrane a permeate fluid enriched in the relatively polar fluid and deficient in the relatively non-polar fluid; and
withdrawing from the membrane a non-permeate fluid enriched in the relatively non-polar fluid and deficient in the relatively polar fluid.

10. The method of claim 9, wherein the feed fluid is a liquid and the permeate fluid is a gas.

11. The method of claim 9, wherein the feed fluid is a gas and the permeate and non-permeate fluids are gases.

12. The method of claim 9, wherein the relatively non-polar fluid is $CO_2$.

13. The method of claim 12, wherein the relatively polar fluid is $NO_2$, $SO_2$, or $H_2S$.

14. The method of claim 9, wherein the relatively non-polar fluid is $CH_4$ and the relatively polar fluid is $CO_2$.

15. A method of separating a relatively polar fluid from relatively non-polar fluid, comprising the steps of:
introducing a feed fluid comprising the relative polar fluid and the relatively non-polar fluid to the membrane of claim 5;
withdrawing from the membrane a permeate fluid enriched in the relatively polar fluid and deficient in the relatively non-polar fluid; and
withdrawing from the membrane a non-permeate fluid enriched in the relatively non-polar fluid and deficient in the relatively polar fluid.

16. The method of claim 15, wherein the feed fluid is a liquid and the permeate fluid is a gas.

17. The method of claim 15, wherein the feed fluid is a gas and the permeate and non-permeate fluids are gases.

18. The method of claim 15, wherein the relatively non-polar fluid is $CO_2$.

19. The method of claim 18, wherein the relatively polar fluid is $NO_2$, $SO_2$, or $H_2S$.

20. The method of claim 15, wherein the relatively non-polar fluid is $CH_4$ and the relatively polar fluid is $CO_2$.

* * * * *